INVENTOR.
HUGO A. MENEGHELLI
ATTORNEYS

United States Patent Office 2,800,794
Patented July 30, 1957

2,800,794

FLOWMETER

Hugo A. Meneghelli, China Lake, Calif.

Application June 1, 1953, Serial No. 358,992

3 Claims. (Cl. 73—228)

(Granted under Title 35, U. S. Code (1952), sec. 266)

The invention described herein may be manufactured by or for the Government of the United States of America for governmental purposes without the payment of any royalties thereon or therefor.

The present invention relates to flow meters and particularly to a flow meter capable of measuring the rate of flow of the liquid in a closed conduit.

The flow meter of this invention may have a wide variety of applications, but it has particular utility in certain specialized applications such as, for example, the measurement of liquid flows in a missile in flight and the transmission of this information to a ground station by telemetering. For this particular application, it is desired that the flow meter or gage be of a type in which certain particular characteristics can be realized. For one thing, it is desired that the gage or meter be extremely compact. It is also desired that the gage not be affected by unbalanced acceleration forces such as are normally encountered in changing the position of the gage or flow meter in the earth's gravitational field, and, what is even more important, that the gage not be subject to errors resulting from set back forces which are applied during the acceleration period of a missile. The gage of this invention realizes these advantageous characteristics and, as pointed out, has particular utility in the specific application described, although it is to be understood that the gage is adapted for use in many other applications.

The principle of operation of the gage or meter of this invention is related to the fact that whenever a moving mass of liquid or fluid is forced to change its original direction a reaction force is produced having components opposite to the direction of original flow of the fluid and perpendicular thereto. That this reaction force is present in these circumstances has been recognized in hydraulic engineering. It may be expressed mathematically and it has often been computed for the purpose of bracing pipes and holding them in place whenever there are flows changed in direction. This invention utilizes these reaction forces as an indication of the volume of flow in a section of pipe which is mounted with flexible couplings to permit the section to move a nominal amount which in this particular invention is rotational, that is, angular movement. The movement actuates a suitable indicating or recording device. The flexible couplings act to both restrain and dampen the movement of the gage section.

In the particular representative embodiment of this invention a form of gage is disclosed, as will be described, in which the particular reaction force utilized is one in the form of a torque, which tends to rotate the gage section about its longitudinal axis, that is, in a plane perpendicular to the direction of flow.

The primary object of the invention is to provide a flow meter or gage adapted to measure the rate of flow of fluids which is extremely compact, simple in construction and not adversely susceptible to acceleration forces, such that it is adapted for use in a missile in flight.

Another object of the invention is to provide a flow meter or gage in the form of a section of pipe or conduit attached by flexible couplings to a fluid system and having means in it such that flow of fluid through the section imparts a torque to it causing it to rotate a nominal or limited amount.

Another object of the invention is to provide a flow meter as in the foregoing object wherein the section has within it a helical or propeller-type member such that when fluid traverses the helical member a torque is imparted to it so as to rotate the section a nominal amount.

Further objects and numerous of the advantages of the invention will become apparent from the following detailed description and annexed drawings wherein.

Figure 1:
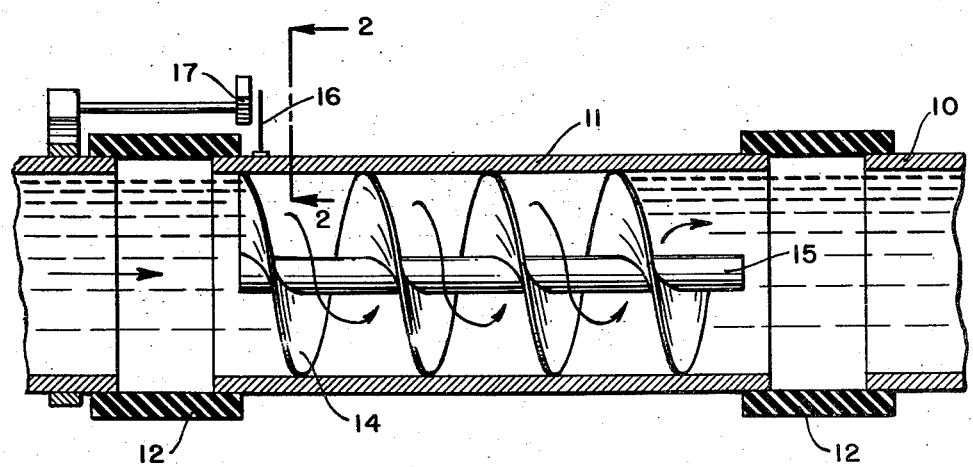
Fig. 1 is a cross sectional view of a preferred form of the invention.
Figure 2:
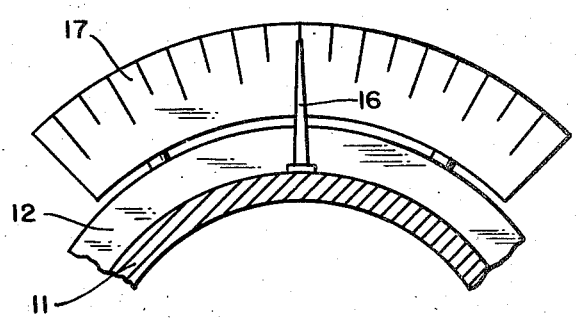
Fig. 2 is a detailed view taken along the line 2—2 of Fig. 1.

Referring now more in detail to the drawings, numeral 10 designates a conduit forming part of a fluid system which may be a liquid system such as a system conducting a liquid fuel or propellant such as may be used as a source of motive power in a rocket or other missile. Numeral 11 designates a section of pipe or conduit of limited length which constitutes the main element of the gage or flow meter and which is interposed between open end sections of conduit 10 by means of flexible couplings 12, to form a single continuous flow path. Flexible couplings 12 are distortable ring-shaped fittings and the adjacent ends of conduit 10 and pipe section 11 are fixedly inserted in the opposed ends of said couplings 12, as shown, to form fluid-tight sealed joints therewith, as shown in Fig. 1. Within the section 11 is a helical member 14 having a central shaft 15. The peripheral edges of the helical member 14 are fixedly attached to the interior of the section 11.

From the foregoing, it can be seen that the section 11 can rotate relative to the conduit portions 10 by virtue of the flexibility or distortability of the flexible couplings 12. Section 11 carries an indicating pointer 16 which moves adjacent a graduated scale 17 which is graduated to indicate the rate of flow of fluid in suitable units. The flexible couplings 12 are made of a flexible material such as rubber so that they would have a restraining and dampening effect on the movement of section 11.

In the operation of the gage when a fluid flows through, it must, of course, traverse the helical channel formed by the helical member 14 within the section 11. The interaction of the fluid flow with the helix produces force components, one of which is in the form of a torque tending to rotate the gage section 11 angularly about its longitudinal axis. This torque force is a measure of the volume rate of flow of the fluid, and the amount of angular movement of section 11 is proportional to it, and this is indicated on the scale 17 by the pointer 16. When the gage is used in a missile in a telemetering system the gage would, of course, be suitably interconnected to the telemetering transmitter such that the information transmitted would be the gage indication of fluid flow.

From the foregoing it can be seen that the gage is extremely simple and compact and that its moving part has only very limited movement, and does not use delicate balancing or restraining elements. Furthermore, the gage is not subject to error from unbalanced acceleration forces, and particularly it is not subject to error from set back forces such as occur during the acceleration period of a missile.

As previously pointed out, the embodiment of the invention disclosed herein is representative of a preferred form and adaptation thereof and it is to be understood that various changes and modifications may be made in it without departing from its principle of operation. The disclosure is intended to be interpreted in an illustrative rather than a limiting sense and that the scope of the invention be in accordance with the claims appended hereto.

What I claim is:

1. A flow indicator comprising an assembly adapted to be inserted between spaced open ends of stationary sections of a conduit to form therewith a flow path for fluids and to give a visual indication of a condition of flow of said fluids, said assembly comprising a pipe section open at both ends, a resilient coupling member sealingly and fixedly connected to each open end of said pipe section, each said resilient coupling member being adapted to be also sealingly and fixedly connected to one of said spaced open ends of said section of conduit, and means fixed within said pipe section operable upon the passage of fluid therethrough to impart a torque to said pipe section, whereby said pipe section causes distortion of said resilient couplings as it tends to rotate about its longitudinal axis, the said distortion thus giving visual indication of the flow of fluid through said assembly.

2. A flow indicator according to claim 1 wherein said means fixed within said pipe section comprises a helical member fixedly positioned within said pipe section with its longitudinal axis coincident with that of said pipe section whereby the passage of fluid tends to impart a torque to the helical member and thus to the pipe section to which said helical member is fixed.

3. A flow indicator comprising an assembly adapted to be inserted between spaced open ends of stationary sections of conduit to form therewith a flow path for fluids and to give a visual indication of a condition of flow of said fluids, said assembly comprising a pipe section open at both ends, a resilient coupling member sealingly and fixedly connected to each open end of said pipe section, each said coupling member being adapted to be also sealingly and fixedly connected to one of said spaced open ends of said sections of conduit, and a helical member fixedly positioned within said pipe section with its longitudinal axis coincident with that of said pipe section whereby the passage of fluid imparts a torque to the helical member and thus to the pipe section to which said helical member is fixed, said torque tending to rotate said pipe section against the return force exerted by the resilience of said couplings, the degree of rotation of said pipe section thus being indicative of the rate of flow of said fluid in said flow path, said pipe section having indicating means mounted adjacent one end thereof, and the conduit section adjacent said one end having cooperating indicating meas thereon, whereby the rate of flow of fluid along said fluid path may be measured.

References Cited in the file of this patent

UNITED STATES PATENTS

| | | |
|---|---|---|
| 702,738 | Montgomery | June 17, 1902 |
| 1,451,272 | Robinson | Apr. 10, 1923 |
| 1,859,071 | Burger | May 17, 1932 |
| 2,470,359 | McLean | May 17, 1949 |

FOREIGN PATENTS

| | | |
|---|---|---|
| 391,083 | France | Aug. 18, 1908 |
| 465,115 | Great Britain | Apr. 30, 1937 |